Oct. 18, 1966     W. E. LONG     3,279,878
BI-FOCAL CORNEAL CONTACT LENS
Original Filed March 30, 1959     2 Sheets-Sheet 1
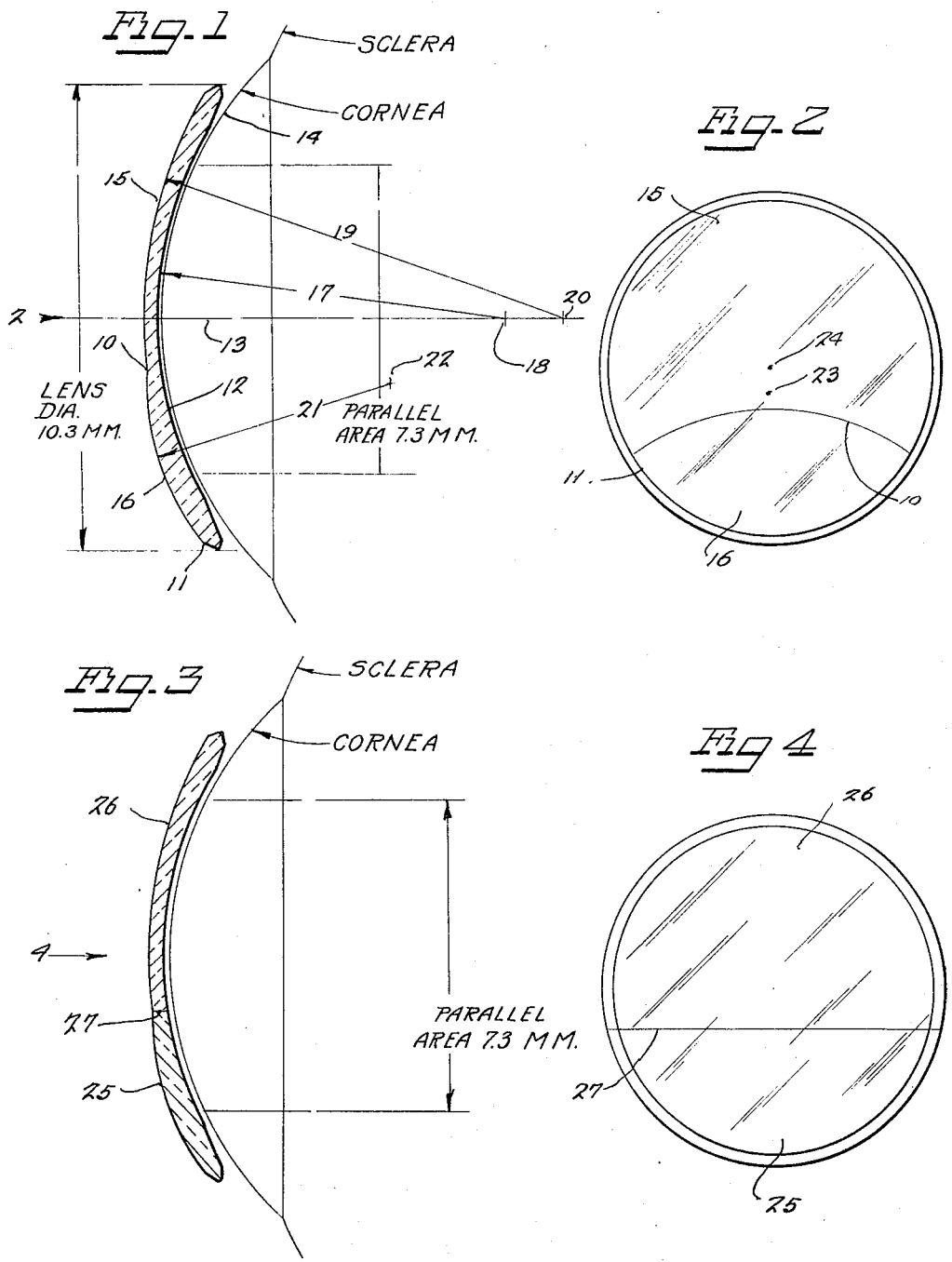
Inventor
WILLIAM E LONG Oct. 18, 1966      W. E. LONG      3,279,878
BI-FOCAL CORNEAL CONTACT LENS
Original Filed March 30, 1959      2 Sheets-Sheet 2
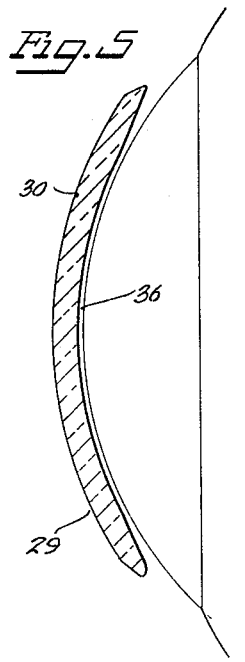
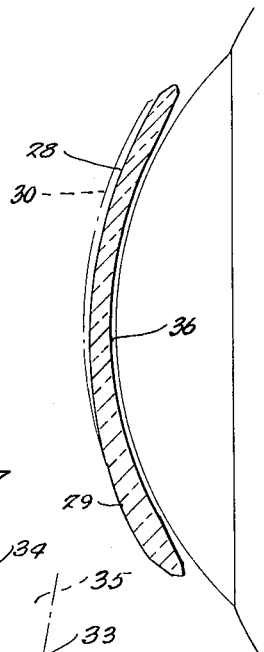
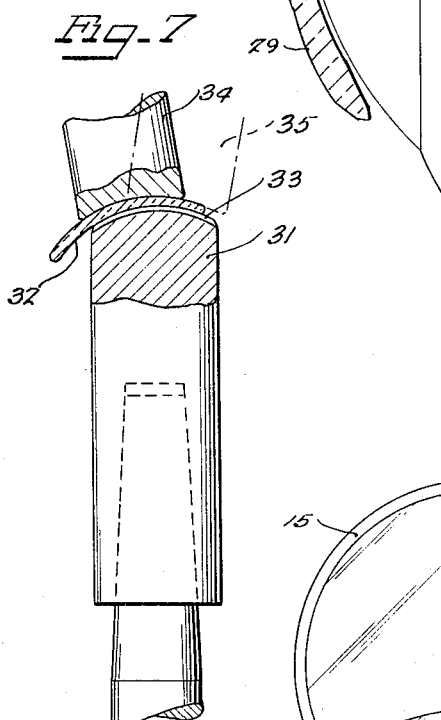
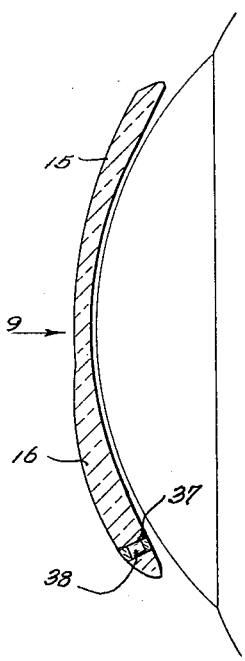
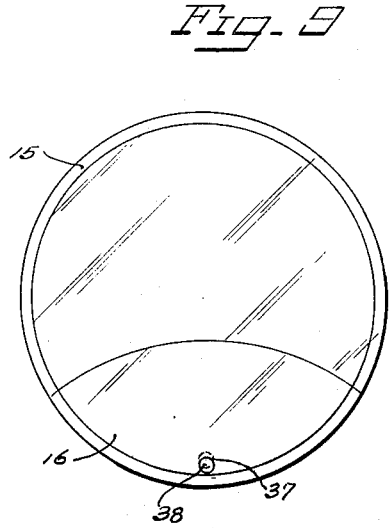
Inventor
WILLIAM E LONG
By Soans, Anderson, Luedeka & Fitch
Atty's 3,279,878
BI-FOCAL CORNEAL CONTACT LENS
William E. Long, Berwyn, Ill., assignor, by mesne assignments, to The Plastic Contact Lens Company, Chicago, Ill., a corporation of Illinois
Continuation of application Ser. No. 802,883, Mar. 30, 1959. This application Apr. 20, 1964, Ser. No. 364,878
3 Claims. (Cl. 351—161)

This invention relates to improvements in bi-focal contact lenses and has its principal value in connection with contact lenses which float upon the cornea. This application is a continuation of my copending application Serial No. 802,883, filed March 30, 1959, now abandoned.

In the case of eyes having astigmatism due to a non-spherical cornea, the space between the contact lens and the cornea is occupied by lachrymal fluid, which, in the case of most eyes, automatically corrects for the non-spherical curvature of the cornea. This is the case because in a contact lens the inside face of the lens has a spherical curvature. In a few cases, the astigmatism may be due to a defect of the lens of the eyeball, or perhaps, if corneal, it may be so large or unusual as to require a special correction of the outer surface of the lens, for which this invention may be employed.

However, the principal value of the invention herein is for bi-focal lenses where there should be maintained a definite orientation between the eyeball and the contact lens carried thereby.

It is not usually considered necessary to be too concerned about perfect correction when the head of a person is laid on the pillow, but it is desirable to have as good vision as possible when the person is reading, and also, when he is looking at distant objects. In such case, the head is held vertical.

Hence, in obtaining the desired advantages of a bi-focal lens, I have found it possible to rely upon the force of gravity to maintain proper orientation between the lens and the cornea. I have also ascertained that a relatively small gravitational force or effect is all that is needed to maintain the corneal contact lens in its properly oriented position, without having to rely upon any other external force applied to the lens.

By any of the methods or construction hereinafter described, I have found it possible to construct a lens which will assume and subsequently maintain a position permanently oriented to a vertical plane passing through the axis of the eye, so that in actual practice, it is not possible to detect or measure any variation greater than the normal margin of error in prescribing and fitting any bi-focal lens.

It will be understood that in making the usual lens the interior face of the contact lens is made spherical or concentric with the cornea, and that the outside face of the lens is also composed of curves which are concentric with the axis of the inner face, so that the lens, if rotated on an axis coinciding with the axis of the lens, will assume any position relative to the vertical. The same conditions prevail when such a lens floats upon the cornea.

A spherically faced lens would never position itself in any one position oriented to the vertical plane above described. If it had a bi-focal reading correction on its exterior surface, that part of the lens might be found at the side or top, or in any intermediate position, rather than in its proper position at the bottom of the lens. The invention herein serves to position and maintain the lens in such oriented position that the bottom close-view portion of the lens, used for reading, is always in the same position at the bottom of the lens. This effect is obtained by constructing the lens in such manner that its center of gravity is a significant distance immediately below the axis of the lens when the lens is properly oriented with its bi-focal portion in the proper location at the bottom of the lens.

In the drawings accompanying this application, there are illustrated contact lenses of the bi-focal type constructed in various ways in accordance with the invention, and by various methods.

In said drawings:

FIGURE 1 represents a vertical section taken through the focal axis of the eye;

FIGURE 2 is an elevation of the lens looking in the direction of the arrow 2 shown in FIGURE 1;

FIGURE 3 is a view similar to FIGURE 1, but showing a two-piece type of construction;

FIGURE 4 is a front view of the lens shown in FIGURE 3, looking in the direction of the arrow 4;

FIGURE 5 is a vertical section taken on the focal axis of a partly finished lens;

FIGURE 6 is a similar section taken through the lens of FIGURE 5 after the bi-focal prescription has been formed on the outside face by grinding;

FIGURE 7 illustrates the method of grinding the lens as shown in FIGURE 5 to the shape shown in FIGURE 6;

FIGURE 8 is a vertical sectional view of a lens, similar to that shown in FIGURE 1, but having additional weighting; and FIGURE 9 is a front elevation of the lens shown in FIGURE 8, looking in the direction of the arrow 9.

Referring to the drawings, the lens shown in FIGURES 1 and 2, as shown, is made with an enlarged, thickened portion shown as being located between the points 10 and 11 having a sharper curvature and consequently shorter focal length than the spherical surface 12 on the interior face of the lens. This is the reading area of the lens and should always be located or oriented with its center below the axis 13 of the lens which intersects the center of the spherical area 12, which area 12 of the lens is parallel with the cornea curvature 14. The upper surface 15 for distance vision is made with a flatter curvature than the curvature 16 of the lower or reading portion of the lens.

As indicated in FIGURE 1, the cornea is of spherical shape, having a radius 17 extending from the center 18 of the cornea. The distance portion 15 has a curvature with a radius 19 extending from the center 20, the said curvature 15 hence being slightly flatter than the spherical surface 17, and thus serving as the distance portion of the lens.

The curvature 16 is a curve formed by a radius 21 extending from the center 22 and is shorter than the radius 17, so that the curvature 16 serves for close-up viewing or reading.

The reading portion 16 of the lens, as shown, averages substantially thicker than the upper or distance portion of the lens, and therefore, the center of gravity of the lens is, in this way, brought down to a level represented by the point 23 (see FIGURE 2), which is a substantial distance below the axis of the lens represented by the point 24 in FIGURE 2. Bringing the center of gravity 23 of the lens as a whole below the axis 24 in this way causes the lens always to maintain the position shown in FIGURE 2, with the center of gravity 23 substantially below the axis 24. If, for any reason, the lens becomes disoriented, the repeated blinking of the eye will, in a relatively short time, cause it to re-orient itself in the position shown in FIGURE 2, with the reading portion 16 located below the distance portion 15 of the lens.

The lenses herein disclosed may be made from a suitable plastic, transparent material which is non-toxic and has the desired refracting characteristics, such as methylmethacrylate, which is sold by Du Pont under the trademark "Lucite" and by Rohm & Haas under the trademark "Plexiglas." If desired, the lens may be made in a single molding operation in a heated press of conventional type having die or cavity parts of the proper size and formed with the desired curvatures, so that when the blank comes out of the press, it will not be necessary to grind either the outside or the inside face of the lens to the desired curvature. In some cases, it may be advantageous to form a blank having only the outer bi-focal surfaces of the desired final curvature, in which case the blank is subsequently ground on the inside in order to form an inner face having a spherical curvature fitting the cornea, it being understood that the outer curvatures of the lens will be properly coordinated with the curvature of the interior surface so that the finished lens will have the required optical properties.

In FIGURES 3 and 4 of the drawings, there is shown a method of constructing a lens similar to that shown in FIGURES 1 and 2, by forming two parts, a lower part 25 for reading purposes, and an upper part 26 for distance. In this case, the two parts 25 and 26 abut each other in a horizontal plane 27, and are united together by some suitable cementing agent which will provide the required bond between the two portions of the lens, and at the same time will not have any toxic effects, or other disadvantages. The radii 17, 19, 21 and the centers 18, 20, 22 of the lens are the same as those of the lens shown in FIGURE 1. Consequently, the optical properties of the lens shown in FIGURE 3 are the same as those of the lens shown in FIGURE 1, and it will orient itself in the same manner. As is shown in the drawing, the lower part 25 is completely formed of the same material as is the upper part 26.

In FIGURES 5, 6 and 7 of the drawings, there is illustrated a lens having the same final characteristics as the lens shown in the preceding examples, but in which the bi-focal characteristics of the lens is imparted to it by performing a grinding operation on that portion of the lens blank which is to become the distance viewing part 28. The entire outer surface of the lens is first ground or otherwise provided with a single sperical curvature, represented by the numeral 29. This curve 29 is the close-up or reading portion of the lens. Subsequently, the upper part 30 of the blank is re-ground in the manner indicated somewhat diagrammatically in FIGURE 7.

Referring to FIGURE 7, the numeral 31 represents a vertical spindle which is rotated by a suitable means, not shown, and on the upper end of this spindle, the lens blank 32 is securely attached by a suitable adhesive 33. As the spindle 31 is rotated, the grinding element 34 is rocked back and forth from its solid line position to its dotted line position shown at 35, so that at the conclusion of the operation, the outer surface 30 of the distance portion of the lens has been reduced in thickness, as shown at 28, and to the required curvature to fit the distance-seeing requirement of the prescription.

As in the other cases described, the interior face 36 of the blank or lens has been, or is then, ground to the proper spherical curvature to fit the cornea.

In FIGURES 8 and 9 of the drawings, there is disclosed a method of using an extra weight applied to the bottom of the reading portion of the lens so as to increase somewhat the self-orienting properties of a lens made by any of the methods previously described. In the present instance, it is shown as being applied to the lens made in the manner set forth in FIGURE 1, in which the outer curvature of the lens is made by a molding operation.

As shown in FIGURES 8 and 9, near the bottom edge of the lens there is drilled a small aperture 37, preferably made as close to the bottom of the lens as is feasible, in order to locate the extra weight as far down as possible on the lens. Within this aperture 37, there is inserted a small cylindrical plug 38 of a relatively heavy metal such as lead, silver or gold. The opening on either side of the plug 38 is then filled with suitable, non-toxic cement having such characteristics as are compatible with those of the material of which the body of the lens blank is made. Any extra cement is then removed, and the seals are then polished off to fit the contour of the adjacent surfaces. This additional weighting just described may be used in cases where it is unusually difficult to obtain and maintain effective orientation of the contact lens.

The posterior surface of the lens of all of the embodiments has its outer peripheral portion formed to provide clearance between the lens edge and the cornea, as shown in the drawings.

Various of the features of the invention believed to be new are set forth in the appended claims.

I claim:
1. A bi-focal corneal contact lens of generally concavo-convex cross section adapted to be retained on the cornea of the eye by capillary attraction produced by a lachrymal layer between the lens and the cornea, said lens having a posterior surface curved to fit the cornea of a patient to which the lens is applied with a tendency to remain centered thereon and having a single base curve in at least the optical area thereof, said lens having a maximum external dimension greater than the normal pupil size and less than the limbal area of the eye, said posterior surface having its outer peripheral portion formed to provide clearance between the lens edge and the cornea, said lens having an upper optical zone and a lower optical zone, said upper optical zone being powered on the anterior surface for distance vision thereof with respect to the cornea of the patient, said lower optical zone being powered also on the anterior surface thereof for near vision with respect to such cornea, the anterior surface of said upper optical zone having a radius of curvature flatter than the radius of curvature of the anterior surface of said lower optical zone to provide the respective distance and near vision powers, with the center of curvature of the anterior surface of said upper optical zone being displaced downwardly relative to the axis of the lens and the curvature itself lying within the spherical extension of the anterior surface of said lower optical zone, the line of intersection of the two anterior curves on the vertical center line of the lens being below the mid point of said center line, the thickest portion of said lens being below said line of intersection and thereby heavier to restrain the lens from rotating on the cornea and to effect substantially constant positioning of said lower optical zone below said upper optical zone.

2. A bi-focal corneal contact lens of generally concavo-convex cross section adapted to be retained on the cornea of the eye by capillary attraction produced by a lachrymal layer between the lens and the cornea, said lens having a posterior surface curved to fit the cornea of a patient to which the lens is applied with a tendency to remain centered thereon and having a single base curve in at least the optical area thereof, said lens having a maximum external dimension greater than the normal pupil size and less than the limbal area of the eye, said lens having an upper optical zone and a lower optical zone, said upper optical zone being powered on the anterior surface for distance vision thereof with respect to the cornea of the patient, said lower optical zone being powered also on the anterior surface thereof for near vision with respect to such cornea, the anterior surface of said upper optical zone having a radius of curvature flatter than the radius of curvature of the anterior surface of said lower optical zone to provide the respective distance and near vision powers, with the center of curvature of the anterior surface of said upper optical zone being displaced downwardly relative to the axis of the lens and the curvature itself lying within the spherical extension of the anterior surface of said lower optical zone, the line of intersection of the two anterior curves on the vertical center line of the lens being below the mid point of said center line, the thickest portion of said lens being below said line of intersection and thereby heavier to restrain the lens from rotating on the cornea and to effect substantially constant position of said lower optical zone below said upper optical zone.

3. A bi-focal corneal contact lens of generally concavo-convex cross section adapted to be retained on the cornea of the eye by capillary attraction produced by a lachrymal layer between the lens and the cornea, said lens having a posterior surface curved to fit the cornea of a patient to which the lens is applied with a tendency to remain centered thereon, said lens having a maximum external dimension greater than the normal pupil size and less than the limbal area of the eye, said lens having an upper optical zone and a lower optical zone, said upper optical zone being powered on the anterior surface for distance vision thereof with respect to the cornea of the patient, said lower optical zone being powered also on the anterior surface thereof for near vision with respect to such cornea, the anterior surface of said upper optical zone having a radius of curvature flatter than the radius of curvature of the anterior surface of said lower optical zone to provide the respective distance and near vision powers, with the center of curvature of the anterior surface of said upper optical zone being displaced downwardly relative to the axis of the lens and the curvature itself lying within the spherical extension of the anterior surface of said lower optical zone, the line of intersection of the two anterior curves on the vertical center line of the lens being below the midpoint of said center line, the thickest portion of said lens being below said line of intersection and thereby heavier to restrain the lens from rotating on the cornea and to effect substantially constant positioning of said lower optical zone below said upper optical zone.

References Cited by the Examiner

UNITED STATES PATENTS

| | | | |
|---|---|---|---|
| 932,965 | 8/1909 | Conner | 351—168 |
| 2,129,305 | 9/1938 | Feinbloom | 351—162 |
| 2,653,515 | 9/1953 | Stimson | 351—160 |
| 3,031,927 | 5/1962 | Wesley | 351—161 |
| 3,102,157 | 8/1963 | Gamber | 351—160 |

FOREIGN PATENTS

| | | |
|---|---|---|
| 478,557 | 1/1938 | Great Britain. |

OTHER REFERENCES

Hall: "Experiences in Fitting Microlenses," article in "Contacto," vol. 2, No. 2, March 1958, pp. 57–60 cited.

Riggs: "Electroretinography in Cases of Night Blindness," article in "The American Journal of Ophthalmology," vol. 38, July 1954, pp. 70–77 cited.

Williamson-Noble: "Sidelights on Refraction," article in "Transactions of the Ophthalmological Society of the United Kingdom," vol. 76, 1956, pp. 633–647 cited.

DAVID H. RUBIN, *Primary Examiner.*